United States Patent [19]
Labauze

[11] Patent Number: 5,811,479
[45] Date of Patent: Sep. 22, 1998

[54] RUBBER COMPOSITION HAVING A BASE OF A DIENE POLYMER HAVING A SILANOL FUNCTION AND COMPRISING AN ORGANOSILANE DERIVATIVE

[75] Inventor: Gérard Labauze, Clermont-Ferrand, France

[73] Assignee: Compagnie Generale des Etablissements Micheline - Michelin & Cie

[21] Appl. No.: 787,777

[22] Filed: Jan. 23, 1997

[30] Foreign Application Priority Data

Jan. 26, 1996 [FR] France ................................. 96 01040

[51] Int. Cl.$^6$ ....................................................... C08K 5/54
[52] U.S. Cl. .......................... 524/188; 525/100; 525/102; 525/105; 525/72; 526/279
[58] Field of Search ..................................... 525/100, 102, 525/105, 72; 526/279; 524/188

[56] References Cited

U.S. PATENT DOCUMENTS

| | | |
|---|---|---|
| 4,618,650 | 10/1986 | Halasa et al. . |
| 4,657,978 | 4/1987 | Wakabayashi et al. .................. 525/106 |
| 4,783,504 | 11/1988 | St. Clair et al. ........................... 525/72 |
| 5,409,969 | 4/1995 | Hamada . |

*Primary Examiner*—Melvyn I. Marquis
*Attorney, Agent, or Firm*—Baker & Botts, LLP

[57] ABSTRACT

The present invention relates to a sulfur-vulcanizable rubber composition comprising, by way of reinforcing filler, carbon black or a mixture of carbon black and silica, at least one functionalized diene polymer bearing at the chain end a silanol function or a polysiloxane block having a silanol end, or modified along the chain by silanol functions and at least one organosilane compound comprising an amine or imine function, which can be used for the manufacture of tires having, in particular, improved hysteresis properties.

17 Claims, No Drawings

RUBBER COMPOSITION HAVING A BASE OF A DIENE POLYMER HAVING A SILANOL FUNCTION AND COMPRISING AN ORGANOSILANE DERIVATIVE

BACKGROUND OF THE INVENTION

The present invention relates to a sulfur-vulcanizable rubber composition which can be used, in particular, for the manufacture of tires having improved hysteresis properties in vulcanized state, comprising a functionalized or modified diene polymer and, as reinforcing filler, carbon black or a mixture of carbon black and silica.

Since savings in fuel and the need to protect the environment have become a priority, it has is desirable to produce polymers which have good mechanical properties and as small a hysteresis as possible in order to be able to place them in the form of rubber compositions which can be used for the manufacture of various semi-finished products entering into the formation of tires such as, for instance, underlayers, connecting rubber compositions between rubbers of different nature or coating rubbers of metal and textile reinforcements, sidewall rubbers, or treads and to obtain tires having improved properties, and in particular a reduced resistance to rolling.

In order to achieve such an object, numerous solutions have been proposed which consist, in particular, in modifying the nature of the diene polymers and copolymers at the end of polymerization by means of coupling, starring or functionalizing agents. The very great majority of these solutions are essentially concentrated on the use of polymers modified with carbon black as reinforcing filler in order to obtain good interaction between the modified polymer and the carbon black, since the use of white reinforcing fillers and in particular of silica, has proved for a long time inappropriate due to the low level of certain properties of the tires employing these compositions. By way of illustration of this prior art, we may cite U.S. Pat. No. 4,550,142 which describes a rubber composition having a base of carbon black and a diene polymer functionalized by means of a derivative of benzophenone which has improved hysteresis properties; U.S. Pat. No. 5,159,009 which describes the use of carbon black modified by polysulfur alkoxysilane derivatives in compositions having a base of diene polymers; U.S. Pat. No. 4,820,751 which describes a rubber composition which can be used in the manufacture of tires comprising a special carbon black used with a silane coupling agent and which can be used with a minor amount of silica when such composition is intended to form a tread; and finally European Patent Application A1-0 519 188 which describes a composition intended to form a tire tread having a base of a diene rubber and of a carbon black modified by incorporation of organic compounds of silicon which are specific to the master mix.

Some solutions have also been proposed concerning the use of silica as reinforcing filler in compositions intended to constitute tire treads. Thus, European Patent Application A-0-299 074 describes a silica-filled rubber composition having a base of a diene polymer functionalized by means of a silane compound having a non-hydrolyzable alkoxy radical. Mention may also be made of European Patent Application A-0 447 066 which describes a silica-filled composition containing a diene polymer functionalized by means of a halogenated silane compound. The silica compounds described in this prior art have not proven useful for constituting tire treads. In fact, despite the improvement in the properties obtained with the use of such functionalized polymers, the latter are still insufficient to reach the level required.

SUMMARY OF THE INVENTION

The object of the present invention is a diene rubber composition containing as reinforcing filler carbon black or a mixture of carbon black and silica, which can be used in the manufacture of tires, in particular treads, having improved hysteresis properties.

Another object of the invention is tire treads and tires having a reduced resistance to rolling.

The Applicant Company has surprisingly discovered that it is possible, without affecting the other properties, to greatly decrease the hysteresis of diene rubber compositions which can be used in the manufacture of tires, in particular treads, comprising as filler, carbon black or a mixture of carbon black and silica, by the use of at least one functionalized diene polymer bearing on the chain end a silanol function or a polysiloxane block having a silanol end, or modified along the chain by silanol functions with at least one organosilane compound comprising one or more amine or imine functions.

The invention relates to a sulfur-vulcanizable rubber composition comprising at least one functionalized or modified diene polymer and carbon black or a mixture of carbon black and silica as reinforcing filler, characterized by the fact that the diene polymer is a functionalized polymer bearing either at the chain end a silanol function or a polysiloxane block having a silanol end, or modified along the chain by silanol function, and by the fact that it comprises at least one organosilane compound having one or more amine or imine functions of general formula I:

in which:

Z represents a primary, or a cyclic or non-cyclic secondary amine function, or an imine function or a polyamine radical, $R^1$, $R^2$, and $R^3$, which may be identical or different, represent an alkyl, aryl, alkaryl or aralkyl group having from 1 to 12 carbon atoms, and preferably having from 1 to 4 carbon atoms, n is a whole number selected from among the values 0, 1 and 2.

One can advantageously select a methyl or ethyl group to represent $R^2$.

By way of non-limitative examples of organosilane compounds of formula I, mention may be made of aminopropyltrimethoxysilane, aminopropyltriethoxysilane, aminopropylmethyldimethoxysilane, aminopropyldimethylmethoxysilane, dimethylaminopropyltrimethoxysilane, methylaminopropyltrimethoxysilane, aminoethylaminopropyltrimethoxysilane, piperidinopropyltrimethoxysilane, pyrrodilinopropyltrimethoxysilane, piperazinopropyltrimethoxysilane, morphilinopropyltrimethoxysilane, imidazolinopropyltrimethoxysilane, pyrazolinopropyltrimethoxysilane, triazolinopropyltrimethoxysilane, benzilidenepropylaminotrimethoxysilane. These organosilane compounds of formula I can be used in quantities varying from 0.1 to 10 parts by weight to 100 parts of functionalized polymers.

All the functionalized polymers bearing at the chain end a silanol function or modified along the chain by silanol functions are suitable, but diene polymers having general formula II are preferred, namely:

in which:

R'$_1$ and R'$_2$, which may be identical or different, represent an alkyl group having from 1 to 8 carbon atoms, x is a whole number from 1 to 1500, and preferably from 1 to 50, and P represents the chain of a diene polymer selected from the group represented by any homopolymer obtained by polymerization of a conjugated diene monomer having from 4 to 12 carbon atoms, and any copolymer of one or more dienes conjugated with each other or with one or more vinyl aromatic compounds, having 8 to 20 carbon atoms.

By way of conjugated dienes there are particularly suitable 1,3-butadiene, the 2,3-di(alkyl C1 to C5)-1,3-butadienes, an aryl-1,3-butadiene, 1,3-pentadiene, 2,4-hexadiene, etc.

By way of vinyl aromatic compounds there are particularly suitable styrene, ortho- meta- and para-methylstyrene, the commercial "vinyl toluene" mixture, para-tertiobutylstyrene, methoxystyrenes, vinyl mesitylene, divinyl benzene, vinyl naphthalene, etc.

The copolymers may contain between 99% and 20% by weight of diene units and 1% to 80% by weight of vinyl aromatic units.

The functionalized diene polymers bearing at the chain end a silanol function or a polysiloxane block having a silanol end, or which are modified along the chain by silanol functions may have any microstructure which is a function of the polymerization conditions employed. The polymers may be block, statistical, sequential, microsequential polymers, etc., and be prepared in mass, in emulsion, in dispersion, or in solution. In the case of an anionic polymerization, the microstructure of these polymers may be determined by the presence or absence of a modifying and/or randomizing agent and the amounts of modifying and/or randomizing agent employed.

By way of preference there are suitable the polybutadienes, in particular those having a content of –1,2 units of between 4% and 80% or those having a cis-1,4 content greater than 80%, polyisoprenes, copolymers of styrene-butadiene and in particular those having a styrene content of between 4 and 50% by weight and, more particularly, between 20% and 40%, a content of –1,2 bonds of the butadiene portion of between 4% and 65%, a content of trans-1,4 bonds of between 30% and 80%, the butadiene-isoprene copolymers and in particular those having an isoprene content of between 5% and 90% by weight and a glass transition temperature (Tg) of –40° C. to –80° C., the isoprene-styrene copolymers and, in particular, those having a styrene content of between 5% and 50% by weight and a Tg of between –25° C. and –50° C. In the case of the butadiene-styrene-isoprene copolymers there are suitable those having a styrene content of between 5% and 50% by weight and more particularly between 10% and 40%, an isoprene content of between 15% and 60% by weight and more particularly between 20% and 50%, a butadiene content of between 5% and 50% by weight and more particularly between 20% and 40%, a content of –1,2 units of the butadiene portion of between 4% and 85%, a content of trans-1,4 units of the butadiene portion of between 6% and 80%, a content of –1,2 plus 3,4 units of the isoprene portion of between 5% and 70%, and a content of trans-1,4 units of the isoprene portion of between 10% and 50%, and more generally any butadiene-styrene-isoprene copolymer having a Tg of between –20° C. and –70° C.

As polymerization initiator, one can use any known monofunctional or polyfunctional anionic or nonanionic initiator. However, an initiator containing an alkaline metal such as lithium or an alkaline-earth metal such as barium is preferably used.

As organolithium initiators there are particularly suitable those having one or more carbon-lithium bonds. Representative compounds are aliphatic organolithium compounds such as ethyllithium, n-butyllithium (n-BuLi), isobutyllithium, dilithium polymethylenes such as 1,4-dilithiobutane, etc. Representative compounds containing barium are those described for example in French Patent Applications A-2 302 311 and A-2 273 822 and French Certificates of Addition A-4 338 953 and A-2 340 958, the content of which is incorporated herein.

The polymerization is, as known per se, preferably carried out in the presence of an inert solvent which may, for instance, be an aliphatic or alicyclic hydrocarbon such as pentane, hexane, heptane, iso-octane, cyclohexane, or an aromatic hydrocarbon such as benzene, toluene or xylene.

The polymerization can be carried out continuously or batchwise. The polymerization is generally effected at a temperature of between 20° C. and 120° C. and preferably close to 30° C. to 90° C. One can, of course, also add at the end of the polymerization a transmetallation agent in order to modify the activity of the living chain end.

The functionalized or modified diene polymers used in the invention can be obtained by analogy by various processes. One can, for example, select one of the four methods described below. A first method consists, as described in the Journal of Polymer Science, Part A, Vol. 3, pages 93–103 (1965), in reacting the living diene polymer with an organosilane functionalization agent, preferably at the outlet of the polymerization reactor and at a temperature identical to or different from and preferably close to the polymerization temperature, in order to form a diene polymer having at the chain end a halosilane function, and subjecting it, as described in the manual "Chemistry and Technology of Silicones," Academic Press, New York, N.Y. (1968), p. 95, to the action of a proton donor in order to obtain the diene polymer functionalized with silanol polymer at the chain end. The linking of these two reactions has already been described by Greber and Balciunas in Makromol. Chem. 69:193–205, 1963. As examples of organosilane functionalization agents capable of reacting with the living diene polymer, mention may be made of the linear dihalosilanes of the formula:

in which:

R$_1$ and R$_2$, which may be identical or different, represent an alkyl group having from 1 to 8 carbon atoms, X represents a halogen atom, preferably chlorine or bromine.

By way of preferred dihalosilane compounds, mention may be made of dichlorodimethylsilane and dichlorodiethylsilane.

A second method consists in reacting the living polymer with a cyclic polysiloxane functionalization agent in order to obtain a polymer having an SiO$^-$ end, doing this in a medium which does not permit the polymerization of said cyclopolysiloxane. By way of cyclic polysiloxanes, mention may be made of those having the formula

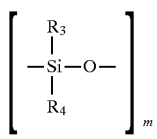

in which:

R₃ and R₄, which may be identical or different, represent an alkyl group having from 1 to 8 carbon atoms, m represents a whole number having a value of 3 to 8, and as preferred cyclic polysiloxane compounds, mention may be made of hexamethylcyclotrisiloxane, trimethyltriethylcyclotrisiloxane, octamethylcyclotetrasiloxane, decamethylcyclopentasiloxane, as well as their mixtures. The polymer having an SiO⁻ end is then reacted with a proton donor compound which leads to the diene polymer functionalized with silanol at the chain end.

A third method consists in preparing block copolymers comprising a polysiloxane block having a silanol end by sequential polymerization. These block copolymers are obtained by the preparation, as described, for example, in U.S. Pat. Nos. 3,483,270 and 3,051,684 and in J. Appl. Poly. Sci. 8:2707–2716, 1964, of a first block of a living diene polymer which is then reacted, in polar medium, with a cyclic polysiloxane which polymerizes anionically forming a second block which leads to a sequential block copolymer comprising a polysiloxane block having an (SiO⁻) end which is then reacted with a proton donor to lead to the block diene polymer comprising a polysiloxane block having a silanol function at chain end.

A fourth method consists in preparing block copolymers comprising a polysiloxane block having a silanol end by the grafting of two polymers, for instance by grafting a dilithium or disodium polysiloxane with a diene polymer having an (SiX) end, X representing a halogen atom, the product of the grafting being then reacted with a proton donor to lead to the block copolymer comprising a polysiloxane block having a silanol end as described, for instance by Greber and Balciunas in Makromol. Chem. 79:149–160, 1964, or cited by Plumb and Atherton in the manual "Block Copolymers", Applied Science, England (1973), p. 339.

The functionalized diene polymers bearing at the chain end a silanol function or a polysiloxane block having a silanol end, or which are modified along the chain by silanol functions having a particular ability to be used to constitute rubber compositions comprising a major part of silica as reinforcing filler. This explains the surprise experienced by the person skilled in the art by the improvement of the hysteresis products of rubber compositions when using such polymers, with the addition of organosilane compounds, when the filler is formed in whole or in part of carbon black.

As carbon blacks which can be used in the rubber compositions of the invention there are suitable all carbon blacks whether or not modified by oxidation or by any other chemical treatment, and in particular all carbon blacks available commercially or conventionally used in tires, and in particular in tire treads. By way of illustration and not of limitation of such blacks, mention may be made of the blacks N134, N234, N375, N356, N339, etc.

The carbon black may represent all of the reinforcing filler, but it may also be used blended with a white filler, and in particular with silica. All silicas are suitable and there may be concerned either conventional silicas or the aforementioned highly dispersible silicas, the latter being, however, preferred.

By highly dispersible silica there is understood any silica having a capability of desagglomeration and dispersion in a very large polymer matrix which can be observed by electronic or optical microscopy in thin sections. As non-limitative examples of such preferential highly dispersible silicas mention may be made of those having a CTAB surface of 450 m²/g or less and particularly those described in patent applications EP-A-0 157 703 and EP-A-0-520 862, the content of which is incorporated herein, or the silica Perkasil KS 340 of the Akzo Company, the silica Zeosil 1165 MP of Rhone-Poulenc, the silica Hi-Sil 2000 of PPG, the silicas Zeopol 8741 and Zeopol 8745 of Huber. There are more particularly suitable silicas having a specific CTAB surface of between 100 and 300 m2/g, both inclusive, and a specific BET surface of between 100 and 300 m2/g, both inclusive, and more preferably those having a ratio of a specific BET surface to a specific CTAB surface of between 1.0 and 1.2, both inclusive, there being of little importance their other additional characteristics such as, for instance, oil absorption, porosity and pore distribution, average diameter, average projected area of aggregates, etc., or the physical condition in which the silica is present, for instance microballs, granules, powder, etc. Of course, by silica there are also understood blends of different silicas. The silica may be used alone or in the presence of other white fillers. The CTAB specific surface is determined in accordance with NFT Method 45007 of November 1987. The BET specific surface is determined by the method of Brunauer, Emmet and Teller described in "The Journal of the American Chemical Society," Vol. 80, page 309, 1938, corresponding to NFT Standard 45007 of November 1987.

The filler ratio may vary from 30 to 100 parts of functionalized polymer bearing at the chain end a silanol function or a polysiloxane block having a silanol end, or modified along the chain by silanol functions. The proportion of silica in the blend may vary from 1 to 200 parts by weight per 100 parts of carbon black, that is to say the silica may represent from 1% to 70% by weight of the total reinforcing filler.

The compositions in accordance with the invention may include one or more functionalized diene polymers bearing at the chain end a silanol function or a polysiloxane block having a silanol function, or modified along the chain by silanol functions as elastomers used by themselves or blended with any other conventional diene polymer and in particular with any elastomer conventionally used in tire treads. By way of illustration and not of limitation of such conventional elastomers, mention may be made of natural rubber, the non-functionalized diene polymers corresponding to the P chains of functionalized or modified polymers of formula II or these same polymers but coupled or branched or functionalized but with functionalization agents such as, for instance, derivatives of tin or of benzophenone, such as described, for instance in U.S. Pat. Nos. 3,393,182, 3,956,232, 4,026,865, 4,550,142 and 5,001,196.

When the conventional elastomer used in blending is natural rubber or one or more non-functionalized diene polymers such as, for instance, polybutadienes, polyisoprenes, butadiene-styrene copolymers or butadiene-istyrene-isoprene copolymers, this elastomer may be present between 1 to 70 parts by weight per 100 parts of functionalized diene polymer bearing at the chain end a silanol function or a polysiloxane block having a silanol end, or modified along the chain by silanol functions. When the conventional elastomer used for blending is a functionalized polymer with a derivative of tin or benzophenone such as, for instance, the bisdialkylaminobenzophenones, thiobenzophenone, the chlorotrialkyl tins or a polymer starred by tin tetrachloride, this elastomer can be present in an amount of 1 to 100 parts by weight per 100 parts by weight of functionalized polymer bearing at the chain end a silanol function or a polysiloxane block having a silanol end, or modified along the chain by silanol functions.

The compositions in accordance with the invention can, of course, also contain the other constituents and additives customarily employed in rubber mixes, such as plasticizers, pigments, antioxidants, sulfur, vulcanization accelerators, extender oils, one or more coupling or silica-bonding agents and/or one or more silica-covering agents such as polyols, amines, alkoxysilanes, etc.

Another object of the present invention is a new process of preparing diene rubber compositions comprising as reinforcing filler carbon black or a mixture of carbon black and silica, characterized by incorporating by thermo-mechanical working into an elastomer comprising at least one functionalized diene polymer bearing at the chain end a silanol function or a polysiloxane block having a silanol end, or modified along the chain by silanol functions at least one organosilane compound comprising an amine or imine function in accordance with general formula I.

The incorporating of the organosilane compound of formula I is effected in any suitable device, for instance in an internal mixer or an extruder in a manner known per se.

In accordance with a first method, the elastomer or blend comprising at least one functionalized diene polymer bearing at the chain end a silanol function or a polysiloxane block having a silanol end or modified along the chain by silanol functions is subjected to a first thermo-mechanical working phase after which the organosilane compound of formula I is added to the elastomer and the mixing of the two components is effected in a second phase, whereupon the carbon black and the other components customarily used in rubber compositions intended for the manufacture of tires with the exception of the vulcanization system are added and the thermo-mechanical working is continued for a suitable period of time.

In accordance with a second method, the elastomer comprising at least one functionalized diene polymer bearing at the chain end a silanol function or a polysiloxane block having a silanol end or modified along the chain by silanol functions and the organosilane compound of formula I are subjected to a first thermo-mechanical working phase, whereupon the carbon black and the other components customarily used in rubber compositions intended for the manufacture of tires, with the exception of the vulcanization system, are added and the thermo-mechanical working is continued for a suitable period of time.

In accordance with a third method, the elastomer comprising at least one functionalized diene polymer bearing at the chain end a silanol function or a polysiloxane block having a silanol end or modified along the chain by silanol functions, the organosilane compound of formula I and the carbon black are subjected to a first thermo-mechanical working phase, whereupon the other components customarily used in rubber compositions intended for the manufacture of tires, with the exception of the vulcanization system, are added and the thermo-mechanical working is continued for a suitable period of time.

In the event that both carbon black and silica are used as reinforcing filler, one effects thermo-mechanical working, in succession, of the functionalized elastomer bearing at the chain end a silanol function or a polysiloxane block having a silanol end, or modified along the chain by silanol functions, the organosilane compound of formula I, silica and bonding agent, whereupon the carbon black is added.

The thermo-mechanical working is in this case preferably carried out in two thermal steps separated by a step of cooling to a temperature below 100° C., as described in patent application EP-A-0 501 227.

To the mixture obtained by any of the embodiments there is finally added the vulcanization system as known per se in a finishing step before proceeding with the vulcanization of the composition.

DESCRIPTION OF PREFERRED EMBODIMENTS

The invention is illustrated but not limited by the following examples in which the properties of the compositions are evaluated as follows:

Mooney viscosity: ML (1+4) at 100° C., measured in accordance with ASTM Standard D-1646.

Shore A hardness: Measurements effected in accordance with DIN Standard 53505.

Moduli of elongation at 300% (ME 300), 100% (ME 100) and 10% (ME 10): Measurements carried out in accordance with ISO Standard 37.

Scott breakage indexes: Measured at 20° C. Rupture force (RF) in MPa Elongation upon rupture (ER) in %.

Hysteresis losses (HL): Measured by rebound at 60° C. in %

Dynamic shear properties: Measurements as a function of the deformation: Carried out at 10 Hertz with a peak-peak deformation ranging from 0.15% to 50%. The non-linear ΔG expressed in MPA is the difference in shear modulus between 0.15% and 50% deformation.

The hysteresis is expressed by the measurement of tan δ at 7% deformation and at 23° C. in accordance with ASTM Standard D2231-71 (reapproved in 1977).

EXAMPLE 1

This control example is for the purpose of comparing the properties of a composition having a base of a functionalized polymer bearing at the chain end a silanol function with two compositions having a base of the same polymers but one not functionalized and the other functionalized with a functionalization agent known in the prior art as producing interesting hysteresis properties in the case of compositions reinforced with carbon black.

In all the tests of this example, the diene polymer is a styrene-butadiene copolymer having a content of polybutadiene vinyl bond of 41% by weight, a content of styrene bone of 25% by weight and the Mooney viscosity of which is 30.

The styrene-butadiene copolymers used in the three compositions are:

For test A, a copolymer bearing a terminal silanol function, functionalized for this purpose by means of a cyclic siloxane functionalization agent (SBR-A), For test B, a copolymer functionalized (SBR-B) with n-Bu$_3$SnCl as described in U.S. Pat. Nos. 3,956,232 and 4,026,865, For test C, a non-functionalized copolymer stopped with methanol (SBR-C).

For all the tests, the copolymer is prepared in a reactor of a useful capacity of 32 liters with agitator of turbine type into which toluene, butadiene, styrene and THF are introduced continuously in a mass ratio of 100:10:4.3:0.3 and a solution of 1030 micromoles of active n-BuLi to 100 g of monomers. The rates of flow of the different solutions are calculated so as to give an average dwell time of 45 minutes with strong stirring. The temperature is maintained constant at 60° C. At the outlet of the reactor, the measured conversion is 88%. The copolymer is then either stopped with methanol as in the case of SBR-C or functionalized during the course of a further step.

The copolymer used in test A is functionalized as described below.

At the outlet of the reactor upon entrance into a static mixer, hexamethylcyclotrisiloxane ($D_3$) is added in a ratio of $D_3$ to active n-BuLi of 0.48. The functionalization reaction is carried out at 60° C.

Three minutes after the addition of the functionalization agent, 0.5 parts of 4,4'-methylene-bis-2,6-ditertiobutyl phenol per 100 parts of elastomer is added as antioxidant agent. The functionalized copolymer is recovered by a conventional operation of steam stripping of the solvent operation and then dried in an oven at 50° C.

By means of the three copolymers SBR-A, B and C, there are prepared, as known per se, three rubber compositions A1, B1 and C1, respectively, reinforced exclusively by carbon black, in accordance with the following formulation in which all parts are expressed by weight:

Elastomer: 100

Black N 234: 50

Aromatic oil: 5

Zinc oxide: 2.5

Stearic acid: 1.5

Antioxidant (a): 1.9

Paraffin wax (b): 1.5

Sulfur: 1.4

Sulfenamide (c): 1.4

(a): Antioxidant: N-(1,3-dimethyl-butyl)-N'-phenyl-p-phenylenediamine
(b): Paraffin wax: Mixture of macro and microcrystalline waxes
(c): Sulfenamide: N-cyclohexyl-2-benzothiazyl sulfenamide The compositions are prepared in a single step in order to obtain a mixture in an internal mixer filled 70%, the temperature of the tank being 60° C. and the average speed of the blades 45 rpm.

The elastomer is introduced into the tank and then, after a suitable period of mixing, all the other components of the formulation with the exception of the vulcanization system are added and the thermo-mechanical mixing work is continued to the temperature of 180° C. The mixture is recovered, whereupon the sulfur and the sulfenamide constituting the vulcanization system are added in the homo-finisher at 30° C.

The vulcanization is carried out at 150° C. for 40 minutes. The properties of the three compositions are compared with each other both in vulcanized state and in non-vulcanized state.

The results are set forth in Table I.

TABLE I

| Composition | A1 | B1 | C1 |
|---|---|---|---|
| Properties in unvulcanized state | | | |
| Mooney | 70 | 90 | 65 |
| Properties in vulcanized state | | | |
| Shore Hardness | 67.8 | 64.9 | 67.7 |
| ME10 | 5.90 | 4.83 | 5.86 |
| ME100 | 2.22 | 1.95 | 2.18 |
| ME300 | 2.92 | 2.88 | 2.86 |
| ME300/ME100 | 1.32 | 1.48 | 1.31 |

TABLE I-continued

| Composition | A1 | B1 | C1 |
|---|---|---|---|
| Scott breakage indexes | | | |
| 20° C. RF | 23 | 25 | 23 |
| 20° C. ER % | 470 | 440 | 480 |
| Losses 60° C.* | 35 | 28 | 36 |
| Dynamic properties as a function of the deformation | | | |
| ΔG at 23° C. | 2.46 | 10.90 | 2.56 |
| tan δ at 23° C. | 0.25 | 0.20 | 0.26 |

*The deformation for this hysteresis loss measurement is 35%.

Based on the properties in non-vulcanized state and vulcanized state, the composition A1 containing the SBR-A bearing at the chain end a silanol function does not give properties which are significantly improved over composition C1 employing SBR-C stopped with methanol. Only the SBR-B functionalized with the n-$Bu_3SnCl$ makes it possible to obtain a composition B1 having hysteresis properties which are definitely reduced with little and strong deformation.

EXAMPLE 2

The purpose of this example is to show the improvement in the properties of the compositions in accordance with the invention.

With the three copolymers SBR-A, SBR-B and SBR-C used in Example 1, there are prepared three compositions A2, B2 and C2 respectively which differ from the previous ones only by the addition to the elastomer of an organosilane agent of general formula I, which in the present case is aminopropyltrimethoxysilane (APTSI) of the formula: $H_2N-(CH_2)_3-Si(OCH_3)_3$.

The compositions are prepared by the first method described above. The addition of one part by weight of the organosilane per 100 parts by weight of elastomer is effected 20 seconds after the start of the thermo-mechanical mixing operation.

The properties of the compositions obtained are set forth in Table II.

TABLE II

| Composition | A2 | B2 | C2 |
|---|---|---|---|
| Properties in unvulcanized state | | | |
| Mooney | 90 | 90 | 70 |
| Properties in vulcanized state | | | |
| Shore Hardness | 64.5 | 64.0 | 66.0 |
| ME10 | 4.95 | 4.85 | 5.75 |
| ME100 | 2.03 | 2.04 | 2.10 |
| ME300 | 2.80 | 2.93 | 2.80 |
| ME300/ME100 | 1.38 | 1.44 | 1.33 |
| Scott breakage indexes | | | |
| 20° C. RF | 25 | 25 | 24 |
| 20° C. ER % | 410 | 430 | 440 |
| Losses at 60° C.* | 29 | 28 | 35 |
| Dynamic properties as a function of the deformation | | | |
| ΔG at 23° C. | 1.00 | 0.84 | 2.46 |
| tan δ at 23° C. | 0.20 | 0.19 | 0.25 |

*The deformation for this hysteresis loss measurement is 35%.

In view of the properties in vulcanized state, it is noted that the addition to the internal mixer of aminopropyltrimethoxysilane imparts to the composition A2 comprising the SBR-A bearing at chain end a silanol function, improved reinforcement and hysteresis properties compared with composition C2 employing the SBR-C stopped with methanol, and of the same level as those obtained with composition B2 using the SBR-B functionalized with the n-Bu$_3$SnCl.

It is also noted that while the addition of aminopropyltrimethoxysilane greatly improves the properties of composition A2 employing SBR-A, it has practically no effect on the compositions employing SBR-B or SBR-C in this type of mixture having a base of carbon black.

EXAMPLE 3

This example shows through four tests relative to compositions in accordance with the invention employing SBR-A with four different organosilane agents of general formula I, that they actually all provide compositions having improved properties.

The modifying agents selected are therefore:

for Test 1, aminopropyltrimethoxysilane (APTSI) of formula H$_2$N—(CH$_2$)$_3$—Si(OCH$_3$)$_3$, for Test 2, methylaminopropyltrimethoxysilane (MAPTSI) of formula CH$_3$—HN—(CH$_2$)$_3$—Si(OCH$_3$)$_3$, for Test 3, dimethylaminopropyltrimethoxysilane (DMAPTSI) of formula (CH$_3$)$_2$—N—(CH$_2$)$_3$—Si(OCH$_3$)$_3$, for Test 4, imidazolinepropyltrimethoxysilane (IMPTSI) of the formula:

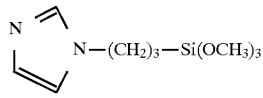

The properties of the four compositions are set forth in Table III.

TABLE III

| Test | 1 | 2 | 3 | 4 |
|---|---|---|---|---|
| Agent | APTSI | MAPTSI | DMAPTSI | IMPTSI |
| Properties in unvulcanized state | | | | |
| Mooney | 90 | 90 | 88 | 92 |
| Properties in vulcanized state | | | | |
| Shore Hardness | 64.5 | 65.0 | 64.8 | 64.6 |
| ME10 | 4.95 | 4.95 | 4.98 | 5.01 |
| ME100 | 2.03 | 2.03 | 2.05 | 2.10 |
| ME300 | 2.80 | 2.86 | 2.91 | 2.94 |
| ME300/ME100 | 1.38 | 1.41 | 1.42 | 1.40 |
| Losses at 60° C.* | 29 | 28.6 | 29.3 | 28.8 |
| Dynamic properties as a function of the deformation | | | | |
| ΔG at 23° C. | 1.00 | 0.94 | 1.00 | 0.90 |
| tan δ at 23° C. | 0.20 | 0.19 | 0.20 | 0.19 |

*The deformation for this hysteresis loss measurement is 35%.

The results show that the different organosilane agents confer improved hysteresis properties upon the compositions compared with those exhibited by the composition employing SBR-A in Example 1 and of the same level as those exhibited by composition B1 employing SBR-B in Example 1.

The reinforcement properties of the four compositions in accordance with the invention are also improved.

EXAMPLE 4

The purpose of this example is to show that the improvement in the properties is also obtained when the reinforcing filler is not formed exclusively of carbon black but of a blend of carbon black and silica. With the three polymers used in Example 1, there are prepared three compositions A4, B4, and C4 having the following formulation:

Elastomer: 100

APTSI: 1

Silica*: 30

Black N 234: 30

Aromatic oil: 20

Bonding agent**: 2.4

Zinc oxide: 2.5

Stearic acid: 1.5

Antioxidant (a): 1.9

Paraffin wax (b): 1.5

Sulfur: 1.1

Sulfenamide (c): 2

Diphenyl guanidine: 1.5

(*) the silica is a highly dispersible silica in the form of microbeads, manufactured by Rhone-Poulenc under the name Zeosil 1165 MP.
(**) the bonding agent is a polysulfur organosilane marketed by Degussa under the name SI69.
(a): Antioxidant: N-(1,3-dimethyl-butyl)-N'-phenyl-p-phenylenediamine
(b): Paraffin wax: Mixture of macro- and micro-crystalline waxes
(c): Sulfenamide: N-cyclohexyl-2-benzothiazyl sulfenamide The obtaining of compositions A4, B4 and C4 using the copolymers SBR-A, SBR-B and SBR-C, respectively, is effected, in accordance with a preferred embodiment, in two thermo-mechanical steps separated by a cooling phase. The first step is carried out in an internal mixer under the same conditions of coefficient of filling, temperature, and speed of the blades as those indicated in Example 1. The organosilane, in the present case APTSI, is, as in the preceding example, added to the elastomer 20 seconds after the start of the mixing of the elastomer and then, one minute after addition of the APTSI, the silica, the bonding agent and the oil are added whereupon, one minute later, the carbon black is added, followed by the stearic acid and the paraffin wax. The thermo-mechanical working is continued until reaching a temperature of close to 160° C. whereupon the elastomer block is recovered and cooled.

The second step is again carried out in the same internal mixer with conditions of temperature and of speed of blades unchanged. The elastomer block is subjected to thermo-mechanical working for a period of time such as to bring the temperature to about 100° C., whereupon the zinc oxide and the antioxidant are added, after which the thermomechanical working is continued up to a temperature close to 160° C. and the mixture is recovered.

The three components constituting the vulcanization system are incorporated in this mixture as known per se during the course of a finishing step.

The vulcanization is carried out as in the other examples for 40 minutes at 150° C.

The properties of the three compositions, A4, B4, and C4 thus obtained are indicated in Table IV and compared with 3 control compositions A4-T, B4-T and C4-T, employing the same copolymers but without APTSI.

TABLE IV

| Composition | A4 | B4 | C4 | A4-T | B4-T | C4-T |
|---|---|---|---|---|---|---|
| Properties in unvulcanized state | | | | | | |
| Mooney | 103 | 98 | 80 | 101 | 95 | 78 |
| Properties in vulcanized state | | | | | | |
| Shore Hardness | 59.4 | 60.5 | 60.6 | 60.0 | 61.7 | 60.9 |

TABLE IV-continued

| Composition | A4 | B4 | C4 | A4-T | B4-T | C4-T |
|---|---|---|---|---|---|---|
| ME10 | 3.87 | 4.18 | 4.24 | 4.14 | 4.62 | 4.29 |
| ME100 | 1.67 | 1.68 | 1.72 | 1.76 | 1.77 | 1.74 |
| ME300 | 2.51 | 2.32 | 2.25 | 2.47 | 2.36 | 2.27 |
| ME300/ME100 | 1.50 | 1.38 | 1.31 | 1.40 | 1.33 | 1.30 |
| Scott breakage indexes | | | | | | |
| 20° C. RF | 23 | 21 | 21 | 22 | 22 | 21 |
| 20° C. ER % | 510 | 520 | 560 | 550 | 590 | 610 |
| Losses at 60° C.* | 22 | 26 | 29 | 25 | 27 | 29 |
| Dynamic properties as a function of the deformation | | | | | | |
| ΔG at 23° C. | 1.66 | 2.53 | 2.89 | 2.16 | 2.93 | 3.00 |
| tan δ at 23° C. | 0.23 | 0.27 | 0.29 | 0.26 | 0.28 | 0.30 |

*The deformation for this hysteresis loss measurement is 42%.

In view of the properties in vulcanized state, it is noted that the addition of APTSI to the internal mixer imparts to the composition A4 employing the silanol functionalized SBR-A improved hysteresis properties not only as compared with those of the composition C4 using the SBR-C stopped with methanol, but also with respect to those of composition B4 using the SBR-B functionalized by n-Bu$_3$SnCl.

Thus, the addition of organosilane agent of formula I to a silanol functionalized polymer results in an improvement in the hysteresis properties even when the carbon black is not the sole filler.

Due to their improved hysteresis properties, the compositions of the invention, when used in a tire in the form of semi-finished products, particularly in the form of treads, make it possible to obtain tires having improved resistance to rolling and therefore make it possible to reduce the fuel consumption.

I claim:

1. A sulfur-vulcanizable rubber composition comprising at least one functionalized or modified diene polymer and, as reinforcing filler, carbon black or a mixture of carbon black and silica, characterized by the fact that the diene polymer is a functionalized polymer bearing at the chain end a silanol function or a polysiloxane block having a silanol end, or modified along the chain by silanol functions, and that the composition furthermore comprises at least one organosilane compound having an amine or imine function in accordance with general formula I:

(Z)—R$^1$—Si(OR$^2$)$_{3-n}$(R$^3$)$_n$ in which:
Z represents a primary or cyclic or non-cyclic secondary amine function, or an imine function or a polyamine radical,
R$^1$, R$^2$, and R$^3$, which may be identical or different, represent an alkyl, aryl, alkaryl or aralkyl group having from 1 to 12 carbon atoms and preferably having between 1 to 4 carbon atoms,
n is a whole number selected from among the values 0, 1 and 2.

2. A composition according to claim 1, characterized by the fact that R$^2$ represents a methyl or ethyl group.

3. A composition according to claim 1, characterized by the fact that the functionalized or modified diene polymer has the general formula II:

P—(SiR$'^1$R$'^2$O)$_x$—H in which:

R$'^1$ and R$'^2$, which may be identical or different, represent an alkyl group having from 1 to 8 carbon atoms,
x is a whole number from 1 to 1500,
P represents a chain of a diene polymer selected from the group represented by any homopolymer obtained by polymerization of a conjugated diene monomer having from 4 to 12 carbon atoms, or any copolymer of one or more dienes conjugated with each other or with one or more vinyl aromatic compounds, having from 8 to 20 carbon atoms.

4. A composition according to claim 1, characterized by the fact that it comprises furthermore natural rubber and/or polybutadiene and/or polyisoprene and/or a butadiene-styrene copolymer and/or a butadiene-styrene-isoprene copolymer.

5. A composition according to claim 1, characterized by the fact that it furthermore comprises one or more polymers functionalized by bisdialkylaminobenzophenones, thiobenzophenone or chlorotrialkyl tins or starred by tin tetrachloride.

6. A composition according to claim 1, characterized by the fact that the carbon black represents the entire reinforcing filler.

7. A composition according to claim 1, characterized by the fact that the reinforcing filler is formed of a mixture of carbon black and silica, which latter represents up to 70% by weight of the total filler.

8. A composition according to claim 7, characterized by the fact that the silica is a highly dispersible silica having a CTAB surface of at most 450 m2/g.

9. A composition according to claim 8, characterized by the fact that the silica has a BET specific surface of between 100 and 300 m2/g, both included, and a ratio of BET specific surface to CTAB specific surface of between 1 and 1.2, both included.

10. A method of preparing a rubber composition having a base of diene elastomer which is vulcanizable with sulfur, having improved hysteresis properties, characterized by incorporating by thermo-mechanical working to an elastomer comprising at least one functionalized diene polymer bearing at the chain end a silanol function or a polysiloxane block having a silanol end, or modified along the chain by silanol functions before addition and incorporation of all the other components customarily used in sulfur-vulcanizable diene rubber compositions, including the reinforcing filler, at least one organosilane compound comprising an amine or imine function having the general formula I:

(Z)—R$^1$—Si(OR$^2$)$_{3-n}$(R$^3$)$_n$ in which:
Z represents a primary or cyclic or non-cyclic secondary amine function, or an imine function or a polyamine radical,
R$^1$, R$^2$, and R$^3$, which may be identical or different, represent an alkyl, aryl, alkaryl or aralkyl group having from 1 to 12 carbon atoms and preferably having from 1 to 4 carbon atoms,
n is a whole number selected from among the values 0, 1 and 2.

11. A method according to claim 10, characterized by the fact that the organosilane compound is placed in the presence of the functionalized or modified diene elastomer before any thermo-mechanical working, and that the organosilane compound of formula I is then incorporated into the elastomer by thermo-mechanical working.

12. A method according to claim 10, characterized by the fact that the organosilane compound is added to the functionalized or modified diene elastomer after an initial phase of thermo-mechanical working of the functionalized or modified diene elastomer, and by the fact that the organosilane compound of formula I is incorporated into the functionalized or modified diene elastomer by thermo-mechanical working.

13. A method according to claim 10, characterized by the fact that the functionalized of modified diene elastomer, the organosilane compound of formula I, and the carbon black are subjected to a first phase of thermo-mechanical working, whereupon the other components customarily employed in rubber compositions intended for the manufacture of tires, with the exception of the vulcanization system, are added, and that the thermo-mechanical working is continued for an appropriate period of time.

14. A method according to claim 12, characterized by the fact that when the reinforcing filler is formed of carbon black and silica, there are added, in succession, to the functionalized or modified diene elastomer which has undergone an initial phase of thermo-mechanical working, in the following order, the organosilane compound of formula I, then the silica and a bonding agent, then an oil and finally a carbon black with a stearic acid and an antioxidizing agent, the elastomer block formed is then recovered and cooled and that in a second thermo-mechanical step there are added to the elastomer block of the first step the other ingredients customarily employed in such sulfur-vulcanizable rubber compositions with the exception of the vulcanization system, that they are incorporated by thermo-mechanical working, that the mixture is recovered, and that, in a finishing step, the vulcanization system is incorporated and the vulcanizable composition recovered.

15. A tire having improved resistance to rolling, which comprises a sulfur-vulcanizable rubber composition comprising at least one functionalized or modified diene polymer and, by way of reinforcing filler, carbon black or a mixture of carbon black and silica, characterized by the fact that the diene polymer is a functionalized polymer bearing at the chain end a silanol function or a polysiloxane block having a silanol end, or modified along the chain by silanol functions, and that the composition furthermore comprises at least one organosilane compound having an amine or imine function of general formula I:

in which:
- Z represents a primary or cyclic or non-cyclic secondary amine function, or an imine function, or a polyamine radical,
- $R^1$, $R^2$, and $R^3$, which may be identical or different, represent an alkyl, aryl, alkaryl or aralkyl group having from 1 to 12 carbon atoms and preferably having from 1 to 4 carbon atoms,
- n is a whole number selected from among the values 0, 1 and 2.

16. A tire according to claim 15, having a tread comprising the composition.

17. A tire tread which comprises a vulcanizable rubber composition comprising at least one functionalized or modified diene polymer and, by way of reinforcing filler, carbon black or a mixture of carbon black and silica, characterized by the fact that the diene polymer is a functionalized polymer bearing at the chain end a silanol function or a polysiloxane block having a silanol end, or modified along the chain by silanol functions, and that the composition furthermore comprises at least one organosilane compound having an amine or imine function of general formula I:

in which:
- Z represents a primary or cyclic or non-cyclic secondary amine function, or an imine function, or a polyamine radical,
- $R^1$, $R^2$, and $R^3$, which may be identical or different, represent an alkyl, aryl, alkaryl or aralkyl group having from 1 to 12 carbon atoms and preferably having from 1 to 4 carbon atoms,
- n is a whole number selected from among the values 0, 1 and 2.

* * * * *